June 28, 1932.  L. M. PERSONS  1,865,207
CONDUCTOR CLIP
Filed Oct. 8, 1926
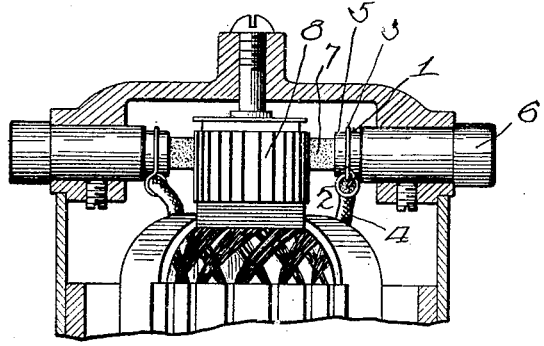
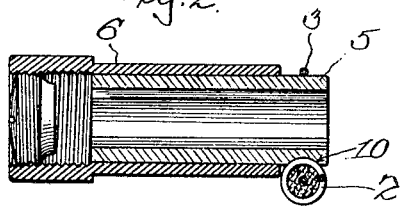
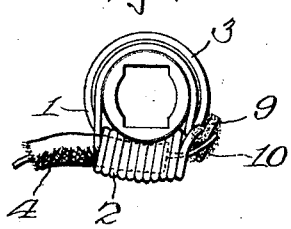 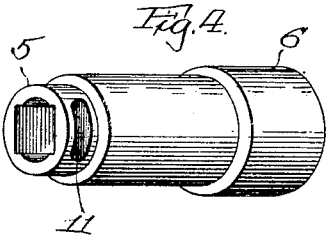
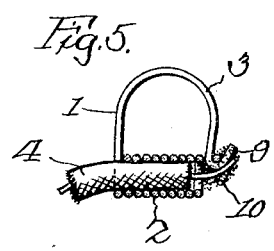 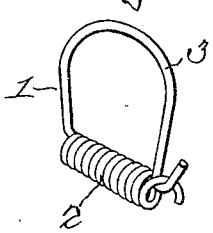
Inventor:
Laurence M. Persons
By Jones, Addington, Ames & Siebold
Attys.

Patented June 28, 1932

1,865,207

UNITED STATES PATENT OFFICE

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS

CONDUCTOR CLIP

Application filed October 8, 1926. Serial No. 140,397.

My invention relates to a conductor clip and has particular reference to a device of this nature which may be used in motors and generators for connecting the motor leads with the conducting portion of the brushholder. It has usually been the custom in connecting the motor leads to the brushholder for a portion of the insulation on the motor leads to be cut back and the wire soldered to the conducting portion of the brushholder. There are many disadvantages to this method. After cutting the insulation back, there are many loose and frayed ends which are pulled toward the commutator by the suction it produces when it rotates. The insulation on the motor leads draws oil from the motor by capillary action and drops of oil gather on the frayed and loose ends of the insulation on these motor leads. These drops of oil are pulled onto the commutator by the suction. The oil is then either thrown off by the commutator or else drops down onto the windings of the armature. This oil which is thrown off by the commutator tends to gum up the motor and does a great deal of harm. Another disadvantage in cutting back the insulation and soldering the wires to the conducting portions of the brushholders is that in order to remove the brushholders from the rest of the motor it is necessary to break the soldered connection, and, to restore the motor to running condition, the connection must be resoldered. This entails much waste of time and money.

The object of my invention is to overcome the above-mentioned difficulties. By having a coiled wire portion into which the end of the motor leads is fastened, there is no possibility of oil collecting on the frayed ends and then being drawn onto the commutator. Also, by securing the conductor clip connected to the motor leads by means of a looped portion of wire, the conductor clips may be slipped on and off of the ends of the conducting portion of the brushholder, thus making it a very simple operation to connect and disconnect the motor leads.

Other objects and advantages will appear from the following detailed description when taken in connection with the accompanying drawing, in which:

Figure 1 is a vertical sectional view of part of a motor showing the conductor clips connecting the motor leads to the brushholders;

Fig. 2 is a sectional view of a brushholder with the brush omitted, but having the conductor clip fastened thereto;

Fig. 3 is an end view of the same;

Fig. 4 is a perspective view of a brushholder showing a groove for holding the clip in place;

Fig. 5 is a cross-sectional view of the conductor clip showing a conductor wire fastened in the coil of the clip and forming a soldered contact with the clip; and Fig. 6 is a perspective view of the clip.

Referring now to the drawing in detail, 1 is a conductor clip with a coiled wire portion 2 and a looped securing portion 3 connecting the motor lead 4 to the conducting portion 5 of the brushholder 6. The brushes 7 held in position by the brushholder 6 are in contact with the revolving commutator 8.

The conductor clip 1 is formed by coiling a wire to receive the end of a conductor wire, as shown in Figs. 3 and 5. One end of the coiled wire is looped around to act as a means for detachably holding the conductor clip in place on the brushholder. The looped wire 3 is secured to the other end of the coiled portion 2 by bending back the looped wire to form a hook 9 and then placing this hook 9 under the end loop 10 of the coil 2. The conducting portion of the brushholder 6 is made with a notch 11, into which a section of the looped portion 3 fits when the clip is in position on the brushholder, and which prevents the clip from sliding off the end of the brushholder. In order to secure the motor lead, or other conductor wire desired, to the conductor clip, the wire is inserted into the coiled portion 2 so that the ends of the insulation on this wire are completely confined within the coil. The end of the wire is then soldered to the parts 9 and 10, and also to the inside of the coil, if so desired, thereby making a secure electrical connection between the conductor wire and conductor clip. Once the wire is fastened within the coiled portion of the conductor clip, it need never be removed unless it is desired to change the conductor wire. In order to connect the motor leads, or other conductor wire, to the brushholder or any support desired, it is necessary only to slip the looped portion 3 of the clip over the conducting end of the brushholder or support, and it will then be kept in place by the notch 10. The loop 3 of the clip is so constructed as to permit the coiled portion to give slightly when the clip is passed over the end of the brushholder, which advantageously permits the pressure exerted against the end of the brushholder by the tension in the coil to keep the clip in place on the brushholder and to make good contact.

It is seen therefore, that my device overcomes many of the defects ordinarily prevalent in devices for connecting the motor leads to the brushholder. The clip shown herein prevents any oil from being drawn from the ends of the insulation on the motor leads onto the commutator. Due to the ease with which the clip may be fastened or removed from the brushholder, much time is saved when it is desired to remove the brushholders from the rest of the motor.

Many changes and modifications may be made in this construction without departing from the spirit of my invention, so I wish to be limited only by such limitations as may appear in the appended claims.

I claim:

1. A conductor clip adapted for use at the end of an insulation covered wire comprising a portion to cover the insulation whereby to conceal the loose or frayed ends of the insulation, said portion consisting of a wire formed into a coil, the wire at one end of said coil being bent into a semi-circular loop and meeting the wire at the opposite end of said coil in a fixed connection, said coil and said loop extending around and in direct contact with a conductor support, the inherent tension in said coil bindingly holding said coil and said loop in tight electrical contact with the conductor support.

2. A detachable conductor clip comprising a coiled wire for confining the ends of the insulation of said conductor wire, said coiled wire having one end looped around and hooked at the other end whereby to detachably secure said loop and said coil to a support, the inherent tension in said coil bindingly holding said loop and said coil in direct electrical contact with the conductor support.

3. In a terminal clamp, a wirelike member bent into a loop to make contact with a conductor support, a portion of the loop being coiled to form a conductor socket and to yieldably hold the remaining portion of the loop in tight electrical contact with the conductor support by the tension in the coil.

4. In a terminal clamp, a wirelike member formed into a loop to make contact with a conductor support, a portion of said loop being coiled to form a conductor socket, the remaining portion being so arranged that the axis of the coiled portion lies in the plane thereof whereby said remaining portion is bindingly held in tight electrical contact with the conductor support by the tension in said coiled portion.

5. The combination with a support, a detachable conductor clip comprising a coiled wire for receiving the end of a conductor wire, said coiled wire having one end looped around and fastened to the other end for detachably securing the loop and coil to the support, said loop extending around the support and being held thereon in tight relation by the tensional effects of said coil.

6. A detachable conductor clip comprising a coiled wire for receiving the end of a conductor wire, said coiled wire having one end looped around and attached to the other end, the axis of the coil lying in the plane of the loop, said coil bindingly holding said loop in electrical contact with the conductor support.

In witness whereof, I have hereunto subscribed my name.

LAWRENCE M. PERSONS.